United States Patent
Nilsson

(10) Patent No.: US 11,168,746 B2
(45) Date of Patent: Nov. 9, 2021

(54) COUPLING FOR AN AWD VEHICLE

(71) Applicant: BorgWarner Sweden AB, Landskrona (SE)

(72) Inventor: Johan Nilsson, Huskvarna (SE)

(73) Assignee: BorgWarner Sweden AB, Landskrona (SE)

(*) Notice: Subject to any disclaimer, the term of this patent is extended or adjusted under 35 U.S.C. 154(b) by 241 days.

(21) Appl. No.: 16/190,248

(22) Filed: Nov. 14, 2018

(65) Prior Publication Data

US 2019/0078626 A1 Mar. 14, 2019

Related U.S. Application Data

(62) Division of application No. 15/023,227, filed as application No. PCT/EP2014/069989 on Sep. 19, 2014, now Pat. No. 10,138,952.

(30) Foreign Application Priority Data

Sep. 19, 2013 (SE) .................................... 1351083-9

(51) Int. Cl.
| | |
|---|---|
| F16D 13/75 | (2006.01) |
| F16D 25/0638 | (2006.01) |
| F16D 25/12 | (2006.01) |
| B60K 17/34 | (2006.01) |

(52) U.S. Cl.
CPC ............ *F16D 25/126* (2013.01); *B60K 17/34* (2013.01); *F16D 13/75* (2013.01); *F16D 13/755* (2013.01); *F16D 25/0638* (2013.01)

(58) Field of Classification Search
None
See application file for complete search history.

(56) References Cited

U.S. PATENT DOCUMENTS

| | | | |
|---|---|---|---|
| 2,536,269 A * | 1/1951 | Driscoll | F16D 55/40 188/71.8 |
| 3,532,190 A | 10/1970 | Palmer | |
| 3,815,716 A * | 6/1974 | Harrington | F16D 25/126 192/70.252 |
| 3,957,146 A * | 5/1976 | Le Blanc | F16D 13/75 192/70.252 |
| 5,749,451 A | 5/1998 | Grochowski | |

(Continued)

FOREIGN PATENT DOCUMENTS

| | | |
|---|---|---|
| JP | 2012219975 A | 11/2012 |
| WO | 2008004974 A1 | 1/2008 |
| WO | 2011043722 A1 | 4/2011 |

*Primary Examiner* — Charles A Fox
*Assistant Examiner* — Ryan P Dodd
(74) *Attorney, Agent, or Firm* — BrooksGroup

(57) ABSTRACT

A coupling for an AWD vehicle comprises a disc package with alternate discs, which are connected for rotation with, but are axially movable in relation to an ingoing and an outgoing axle, respectively, of the coupling, and a hydraulic piston for pressing the disc package together under the action of hydraulic pressure, hereby establishing a connect mode, in which the ingoing axle is connected to the outgoing axle. A coupling slack adjuster is provided for mechanically establishing a rest position for the hydraulic piston in a disconnect mode, in which a predetermined slack in the disc package is established, irrespective of the wear of the discs.

4 Claims, 7 Drawing Sheets

(56) References Cited

U.S. PATENT DOCUMENTS

| | | | | |
|---|---|---|---|---|
| 5,791,447 | A * | 8/1998 | Lamela | F16D 25/0638 |
| | | | | 192/111.1 |
| 7,448,477 | B2 * | 11/2008 | Kingston | F16D 13/757 |
| | | | | 188/196 R |
| 9,284,993 | B1 * | 3/2016 | Kalinsky | F16D 25/0635 |
| 2002/0134640 | A1 * | 9/2002 | Klopfer | F16D 23/143 |
| | | | | 192/98 |
| 2008/0296123 | A1 * | 12/2008 | Vu | F16D 25/126 |
| | | | | 192/85.62 |
| 2013/0161148 | A1 | 6/2013 | Schoon | |

* cited by examiner

COUPLING FOR AN AWD VEHICLE

This application claims priority to SE 1351083-9, filed on Sep. 19, 2013, and PCT application PCT/EP2014/069989, filed Sep. 19, 2014, and is a divisional application of U.S. application Ser. No. 15/023,227 filed Mar. 18, 2016.

TECHNICAL FIELD

The present invention relates to a coupling for an AWD vehicle, comprising
  a disc package with alternate discs, which are connected for rotation with, but are axially movable in relation to an ingoing and an outgoing axle, respectively, of the coupling, and
  a hydraulic piston for pressing the disc package together under the action of hydraulic pressure, hereby establishing a connect mode, in which the ingoing axle is connected to the outgoing axle.

BACKGROUND OF THE INVENTION

As is well known in the art, an AWD (All Wheel Drive) vehicle can be provided with at least one hydraulic disc coupling for distributing the driving torque from the vehicle engine to all of the vehicle wheels. Especially, such a coupling may be provided in the drive line between the front axle and the wheels of the rear axle, most often in the vicinity of the rear axle differential.

Sometimes, it may be desirable to use the AWD vehicle in a FWD (Forward Wheel Drive) mode. In this case the coupling can be disconnected, i. e. its discs are separated from each other.

By operating the vehicle with the coupling in a disconnect mode, rotating masses in the vehicle are reduced, leading to a lower fuel consumption.

In a practical case a propeller shaft or intermediate shaft of the vehicle, possibly including one or two bevel gear transmissions, has a hydraulic disc coupling at one end and a simple coupling, for example a dog clutch, at the other end. In the disconnect mode both these couplings must be disconnected for obtaining the desired effect.

When the AWD mode is resumed, the hydraulic disc coupling must resume its connected state (connect mode) very quickly, say within a period of 0.4-0.5 s or less. For several reasons such a short time from the fully disconnected state is difficult to obtain.

In order to secure proper disconnection, the play between neighboring discs in the coupling must be in the order of typically 0.08-0.10 mm, so that the drag torque from the coupling is minimized. This means that the required movement or stroke of a hydraulically operated piston of the coupling has to be considerable, as there are several discs in the coupling.

On the other hand, wear of the discs in the coupling will result in an even longer piston stroke and accordingly a longer time to reach the connect mode for the coupling from the disconnect mode.

The main object of the invention is thus to minimize the connect time for the coupling, even with worn discs in the coupling.

SUMMARY OF ILLUSTRATIVE VARIATIONS OF THE INVENTION

This according to the invention attained by a coupling slack adjuster for mechanically establishing a rest position for the hydraulic piston in a disconnect mode, in which a predetermined slack in the disc package is established, irrespective of the wear of the discs.

Such a coupling slack adjuster preferably comprises a primary slack adjuster sleeve, which by press fit connection to a member in the coupling and by working relationship with the piston is able to establish a new rest position for the piston during its return stroke from a connect mode to a disconnect mode, governed by a too long stroke of the piston during its working stroke and under the action of a return spring or disconnect spring with a lower force than the force of the press fit.

Within this general framework several practical embodiments are feasible.

In a first embodiment the primary slack adjuster sleeve can be mounted with press fit on a press ring connected to the piston, the movement of the sleeve together with the press ring from a disconnect mode to a connect mode of the coupling being limited by contact with a secondary slack adjuster sleeve attached to a housing of the coupling.

Herein, the primary slack adjuster sleeve and the secondary adjuster sleeve may be so shaped that the primary sleeve is axially guided by the secondary sleeve, whereas a return spring or disconnect spring is arranged between the two sleeves.

The secondary adjuster sleeve may be provided with fingers, which extend through openings in an end wall of the primary slack adjuster sleeve, firmly engage a ring surface in the coupling housing and define the maximum stroke for the primary sleeve.

In a second embodiment the primary adjuster sleeve can be mounted with press fit on a ring surface of a coupling housing, the movement of the sleeve from a disconnect mode to a connect mode of the coupling, when the discs are unduly worn, being induced by a projection on the piston in contact with a sleeve edge.

Herein, a secondary slack adjuster sleeve may be attached to a press ring and the piston and connect these two members, the secondary sleeve getting in contact with the primary sleeve during a return stroke of the piston under the action of a return spring or disconnect spring between the piston and a coupling housing part.

In a third embodiment the primary slack adjuster sleeve can be mounted with press fit on a press ring acted on by the piston over an axial bearing, the movement of the sleeve together with the press ring from a connect mode to a disconnect mode of the coupling being limited by a flange of a secondary slack adjuster sleeve attached to the outgoing axle of the coupling.

Herein, a return spring or disconnect spring can be arranged between the outgoing axle of the coupling and the primary slack adjuster sleeve.

BRIEF DESCRIPTION OF THE DRAWINGS

The invention will be described in further detail below under reference to the accompanying drawings, in which.

DETAILED DESCRIPTION OF ILLUSTRATIVE VARIATIONS OF THE INVENTION

A drive system of an AWD (All Wheel Drive) vehicle is well known in the art. Typical examples are shown in WO 2011/043722. Such a system has an engine, a front axle with a differential, an intermediate shaft or cardan shaft, and a rear axle with a differential. In order to distribute the torque not only to the front axle but also to the rear axle in accordance with the driving conditions, an electronically controlled wet disc coupling is arranged in the driveline to the rear axle, often in the intermediate shaft or otherwise close to the rear differential.

Figure 1:
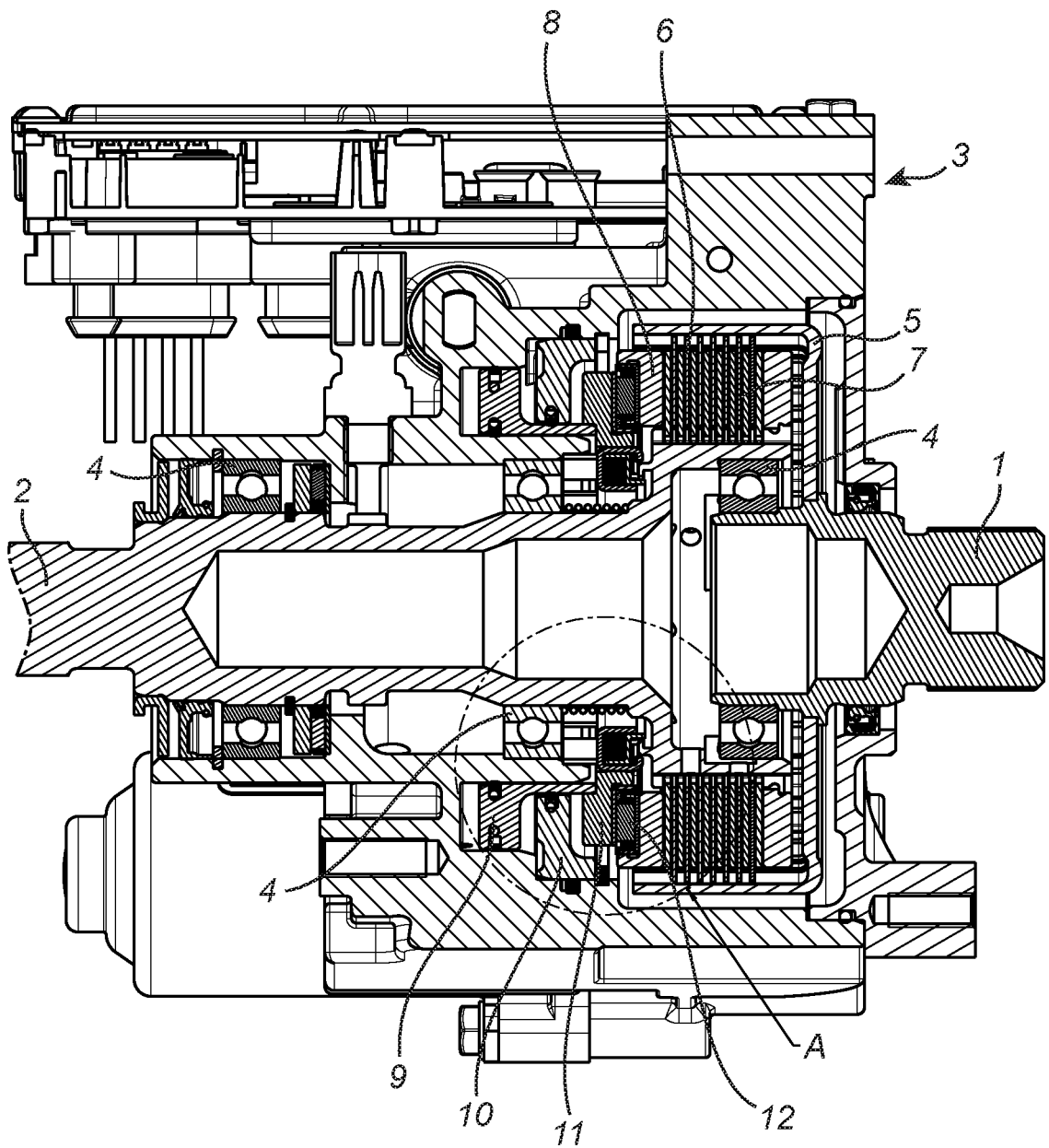
FIG. 1 is a cross section through a wet disc coupling with a slack adjuster according to a first embodiment of the invention, the coupling being shown in a disconnect mode.

A first embodiment of such a wet disc coupling is shown in section in FIG. 1. The description below will focus on such features and details of the coupling that are of importance for a proper understanding of the invention, which is true also for the second and third embodiments.

The purpose of the coupling is to selectively connect an ingoing axle 1 (in the form of a stub axle) to an outgoing axle 2, coaxial therewith. The ingoing axle 1 and the outgoing axle 2 are journaled in relation to each other and to a coupling housing 3 by means of bearings 4. Attached to the ingoing axle 1 is a disc sleeve 5, in which a first set of discs 6 is axially movably arranged. The discs 6 are connected to the disc sleeve 5 for rotation therewith. Correspondingly, a second set of discs 7 is axially movably arranged at the end of the outgoing axle 2. The discs 7 are connected to the end of the outgoing axle 2 for common rotation. Discs from the two sets 6, 7 alternate. The discs together form a disc package. If the discs 6, 7 are pressed together by means of a rotatable disc ring 8, the ingoing axle 1 and the outgoing axle 2 will be connected to each other (connect mode). If not, the ingoing axle 1 and the outgoing axle 2 are not connected to each other (disconnect mode). Lubricating and cooling oil is provided in the compartment containing the discs 6, 7 and neighboring parts. A wet disc coupling is formed. The coupling is shown in its disconnect mode in FIG. 1.

An annular piston 9 is arranged in the coupling housing 3. It is movable in the axial direction of the ingoing axle 1 and the outgoing axle 2. The piston 9 is movable to the right in the drawings under the action of hydraulic pressure admitted to the left of it. The piston 9 is guided by a fixed guide sleeve 10 in the coupling housing 3.

The piston 9 is in contact with an axially movable but non-rotatable press ring 11, which in turn is in contact with the rotatable disc ring 8 via an axial bearing 12.

Figure 3:
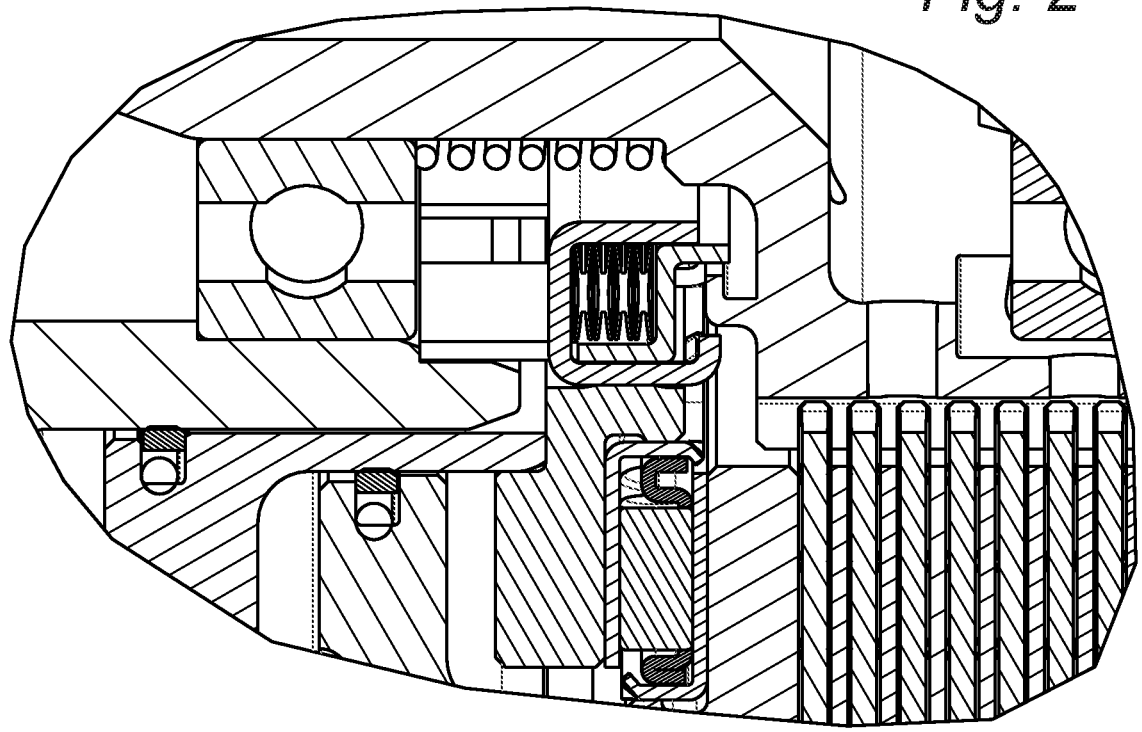
FIG. 3 is the same enlarged portion but with the coupling in a connect mode.

Accordingly, hydraulic pressure acting on the piston 9 to the right in the drawing will be transmitted as an axial force bringing the discs 6, 7 together and establishing the connect mode shown in FIG. 3.

If a connect mode is to be reached very fast from a disconnect mode, the disc wear is of importance. With worn coupling discs the stroke of the piston 9 will increase and accordingly the time needed to attain the connect mode. The invention is directed to solving this problem by providing a coupling slack adjuster.

Figure 2:
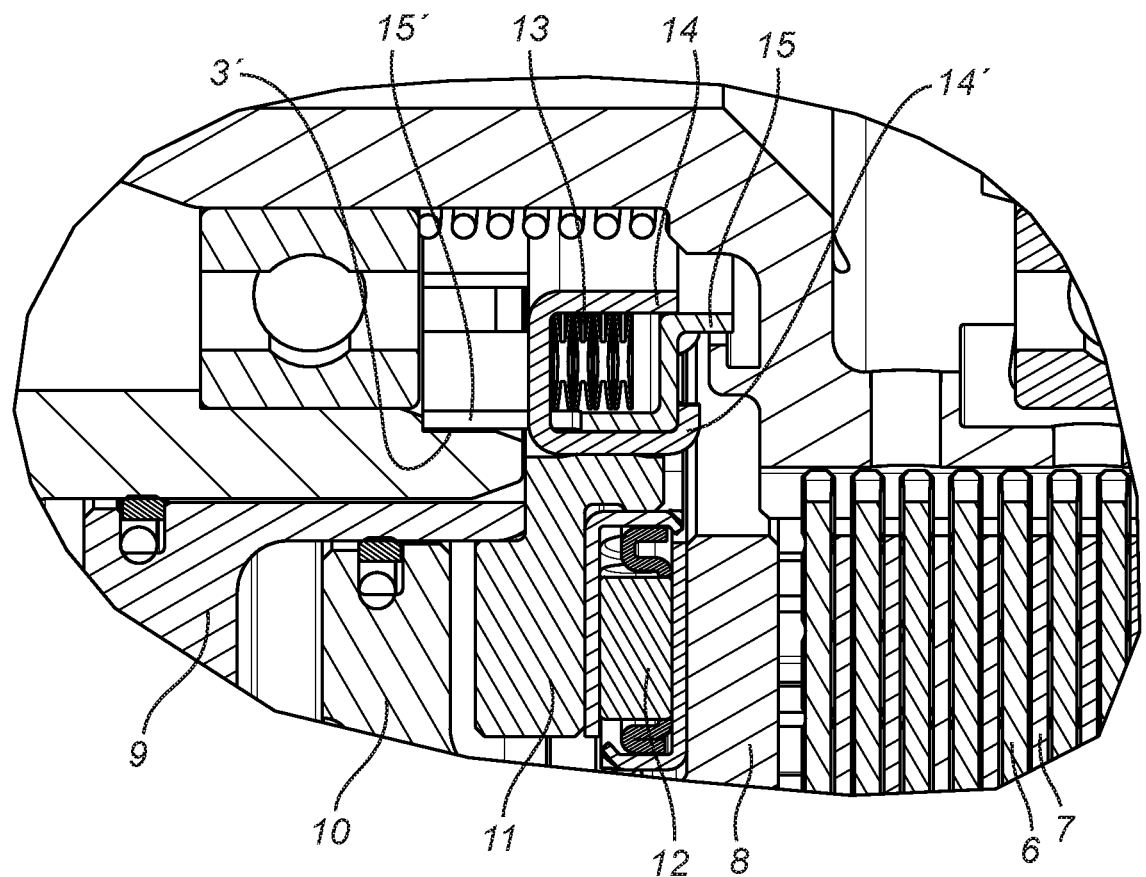
FIG. 2 is an enlarged portion A of FIG. 1.

As most clearly shown in FIGS. 2 and 3, two slack adjuster sleeves are provided: a primary sleeve 14 and a secondary sleeve 15. The primary slack adjuster sleeve 14 is generally U-shaped, whereas the secondary slack adjuster sleeve 15 is generally Z-shaped and suitably dimensioned in relation to the primary sleeve 14 with the result—as appears clearly in FIGS. 2 and 3—that the two sleeves are axially movable in relation to each other and that the secondary sleeve 15 is guided by the primary sleeve 14.

The secondary slack adjuster sleeve 15 is provided with fingers 15' which extend to the left in the drawing through appropriate openings in the left wall of the primary slack adjuster sleeve 14. After insertion of the secondary sleeve 15 in the primary sleeve 14 an edge 14' of the primary sleeve 14 is bent up, so that the secondary sleeve 15 is held within the primary sleeve 14 and the relative axial movement of the secondary sleeve 15 in the primary sleeve 14 is limited.

A compression spring 13, for example in the form of a wave spring, is provided between the two slack adjuster sleeves 14, 15 for providing an axial force pressing the two sleeves axially apart. This spring 13 will—as appears below—act as a return spring for the piston 9. The spring may also be called a disconnect spring. (The spring 13 is not illustrated in an expanded condition in FIG. 2, which it should have been.)

The fingers 15' of the secondary slack adjuster sleeve 15 have a very hard press fit with a ring surface 3' of the coupling housing 3, and in practice the secondary sleeve 15 is fixed to the coupling housing 3.

The primary slack adjuster sleeve 14 is mounted on the press ring 11 with a press fit which is weaker than the press fit of the secondary sleeve 15 to the coupling housing 3.

If hydraulic pressure is applied to the piston 9 in the disconnect mode shown in FIG. 2, the piston 9 and the press ring 11 will move to the right in the drawing. If the slack in the coupling is within desired limits, i.e. its discs 6, 7 are not unduly worn, the end wall of the primary slack adjuster sleeve 14 will not reach the transition line between the fingers 15' and the main part of the secondary sleeve 15, and there will be no relative movement between the press ring 11 and the primary slack adjuster sleeve 14.

If on the other hand the slack in the coupling has exceeded certain desired limits, i.e. its discs 6, 7 are worn, the end wall of the primary slack adjuster sleeve 14 contacts the main part of the secondary sleeve 15. If the hydraulic pressure acting on the piston 9 is high enough, the press fit between the press ring 11 and the primary adjuster sleeve 14 will be overcome, so that the primary adjuster sleeve 14 assumes a new position further to the right on the press ring 11.

At the subsequent return to the disconnect mode shown in FIG. 2 under the influence of the disconnect spring 13, the piston 9 will not return to its end position, because the edge 14' of the primary slack adjuster sleeve 14 will contact the secondary slack adjuster sleeve 15. The press fit of the secondary slack adjuster sleeve 15 is stronger than the force of the disconnect spring 13.

The piston 9 has assumed a new rest position, and a proper slack in the coupling has been reestablished.

Figure 4:
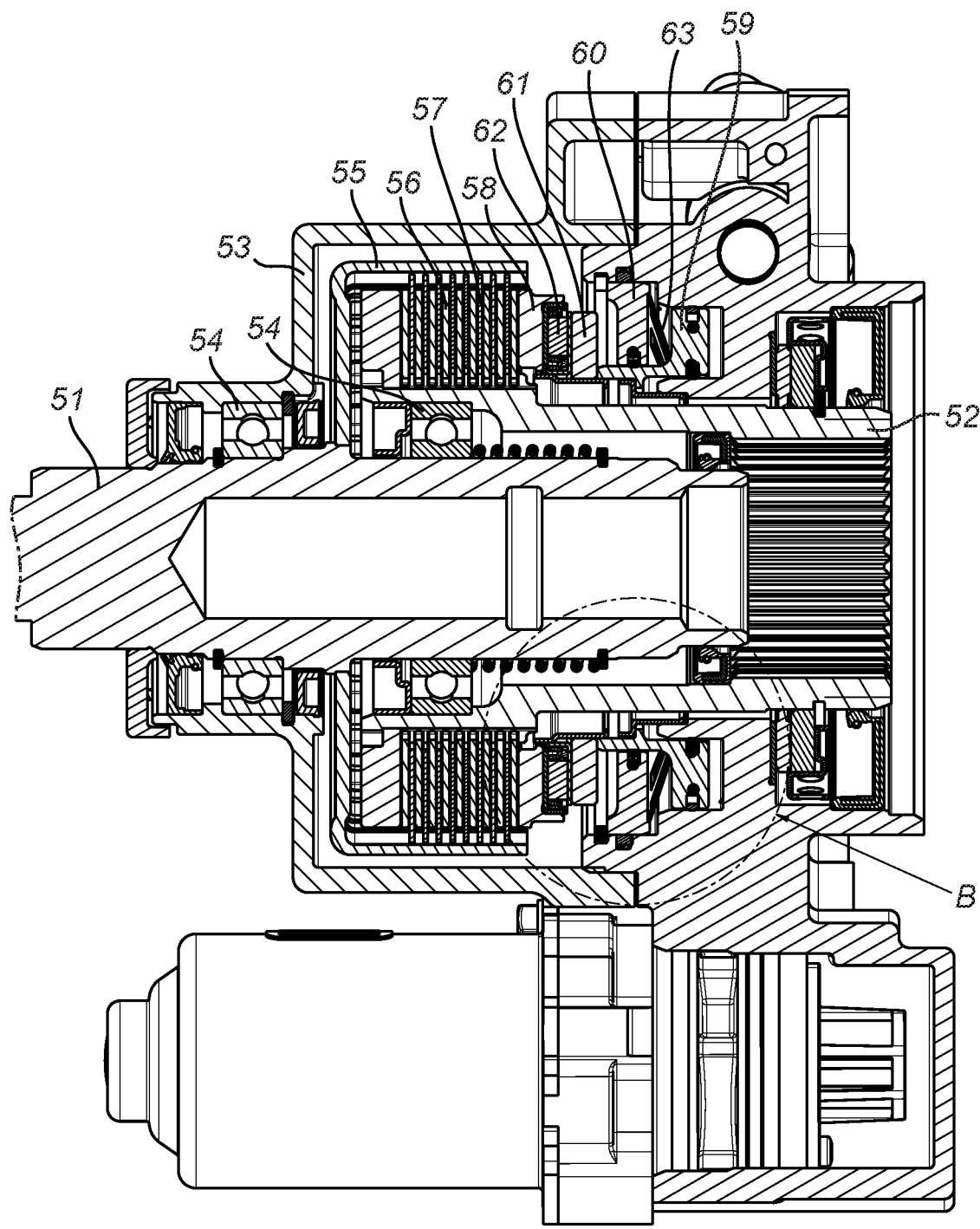
FIG. 4 is a cross section through a wet disc coupling with a slack adjuster according to a second embodiment of the invention, the coupling being shown in a disconnect mode.

A second embodiment of a wet disc coupling is shown in section in FIG. 4.

The purpose of the coupling is to selectively connect an outgoing axle 51 to an ingoing splines sleeve 52, coaxial therewith. For practical reasons this ingoing sleeve will hereinafter be defined as an ingoing axle 52. The axles 51 and 52 are journalled in relation to each other and to a coupling housing 53 by means of bearings 54. Attached to the outgoing axle 51 is a disc sleeve 55, in which a first set of discs 56 is axially movably arranged. The discs 56 are connected to the disc sleeve 55 for rotation therewith.

Correspondingly, a second set of discs 57 is axially movably arranged on the ingoing axle 52. The discs 57 are connected to the axle 52 for common rotation. Discs from the two sets 56, 57 alternate. If the discs 56, 57 are pressed together by means of a rotatable disc ring 58, the outgoing axle 51 and the ingoing axle 52 will be connected to each other (connect mode). If not, the axles 51, 52 are not connected to each other (disconnect mode). Lubricating and cooling oil is provided in the compartment containing the discs 56, 57 and neighboring parts. A wet disc coupling is formed. The coupling is shown in its disconnect mode in FIG. 4.

An annular piston 59 is arranged in the coupling housing 53. It is movable in the axial direction of the axles 51 and 52. The piston 59 is movable to the left in the drawings under the action of hydraulic pressure admitted to the right of it. The piston is guided by a fixed guide sleeve 60 in the coupling housing 53.

The piston 59 is in contact with an axially movable but non-rotatable press ring 61, which in turn is in contact with the rotatable disc ring 8 via an axial bearing 62.

Figure 6:
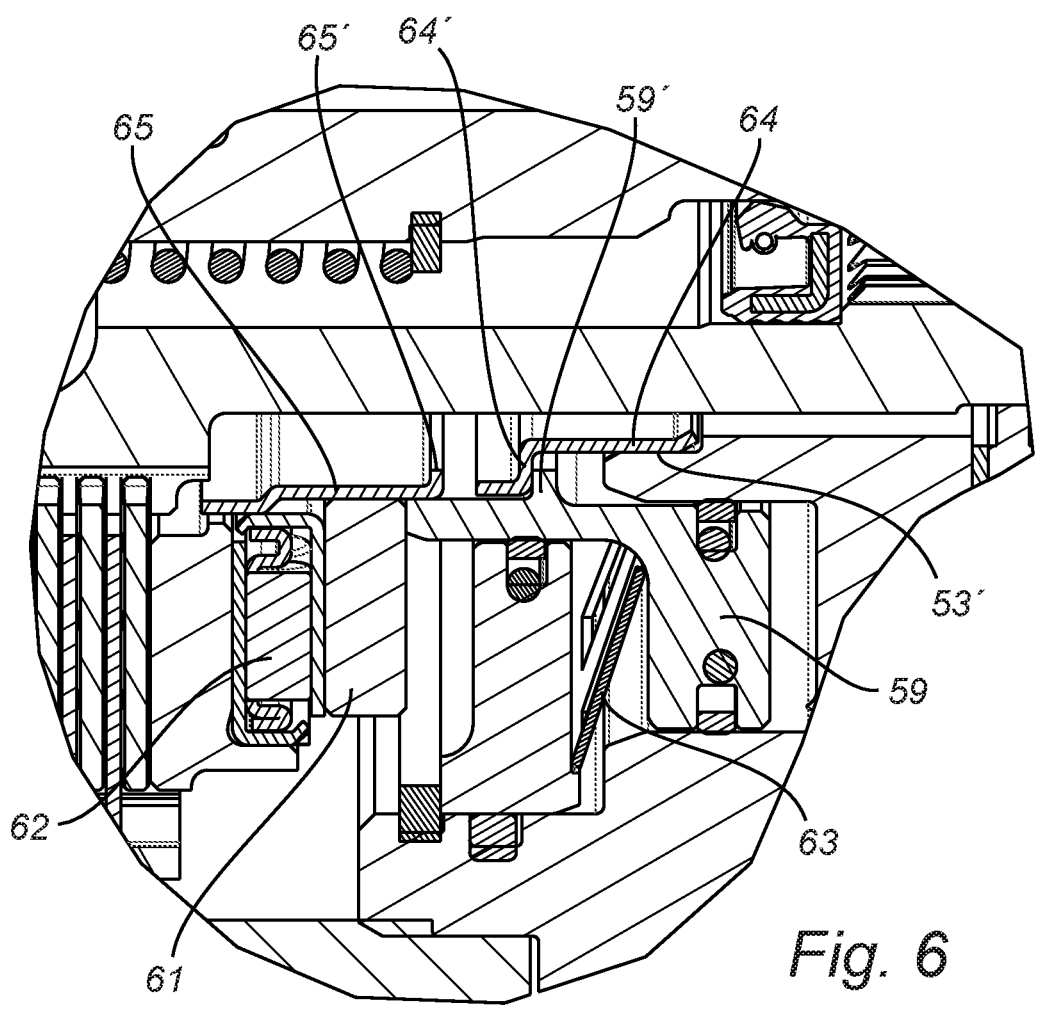
FIG. 6 is the same enlarged portion but with the coupling in a connect mode.

Accordingly, the hydraulic pressure acting on the piston 59 will be transmitted as an axial force bringing the discs 56, 57 together, establishing the connect mode shown in FIG. 6.

A return spring for the piston 59 in the form of a Belleville spring 63 is arranged between the piston 59 and the guide sleeve 60. The return spring 63 may alternatively be called a disconnect spring.

Figure 5:
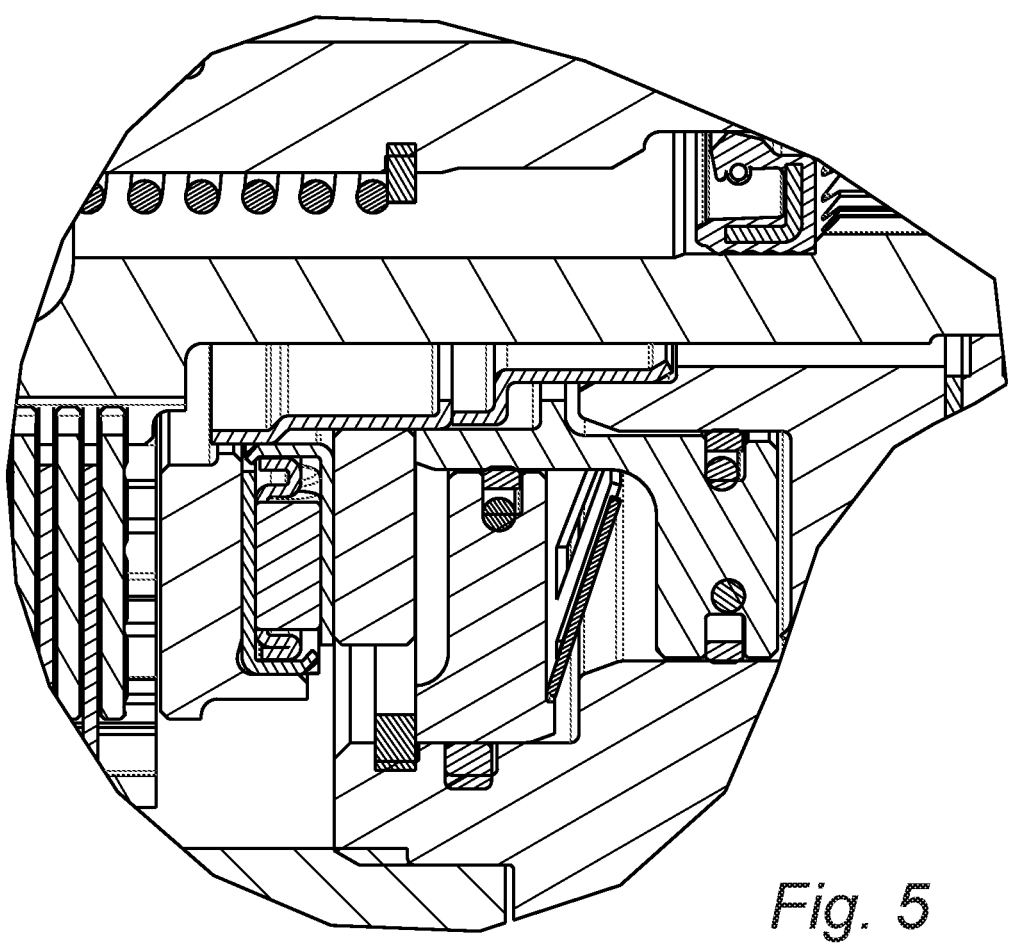
FIG. 5 is an enlarged portion B of FIG. 4.

As most clearly shown in FIGS. 5 and 6, two slack adjuster sleeves are provided: a primary sleeve 64 and a secondary sleeve 65.

The secondary slack adjuster sleeve 65 in fact establishes a fixed connection between the piston 59 and the press ring 61 and accordingly has a very hard press fit with these components. It also provides a radial guiding for the axial bearing 62. The secondary slack adjuster sleeve 65 can be provided with an end flange 65' for the primary slack adjuster sleeve 64 to cooperate with. The secondary slack adjuster sleeve 65 could be replaced by another type of connection means.

The primary slack adjuster sleeve 64 has a press fit with a ring surface 53' of the coupling housing 53. This press fit is weaker than the press fit for the secondary slack adjuster sleeve 65 and will allow relative movements between the primary slack adjuster sleeve 64 and its ring surface 53' under a certain condition to be described.

The piston 59 is provided with an annular projection 59', which is intended for cooperation with a sleeve edge 64'.

If hydraulic pressure is applied to the piston 59 in the disconnect mode shown in FIG. 5, the unit comprising the piston 59 and the pressure ring 61 held together by the primary slack adjuster sleeve 64 will move to the left in the drawing. If the slack in the coupling is within desired limits, i.e. its discs 56, 57 are not unduly worn, the piston projection 59' will not reach the sleeve edge 64', and the primary adjuster sleeve 64 will not be moved to the left.

If on the other hand the slack in the coupling has exceeded desired limits, i.e. its discs 56, 57 are unduly worn, the piston projection 59' will get in contact with the sleeve edge 64' for moving it to the left in the drawing. If the hydraulic pressure acting on the piston 59 is high enough, the press fit between the primary slack adjuster sleeve 64 and the housing ring surface 53' will be overcome, so that the primary sleeve 64 assumes a new position further to the left on the housing ring surface 53'.

At the subsequent return to the disconnect mode shown in FIG. 5 under the influence of the disconnect spring 63, the piston 59 will not return to its end position, because the sleeve flange 65' gets in contact with the primary slack adjuster sleeve 64. This sleeve 64 is held in its position by its press fit, which is stronger than the force of the disconnect spring 63.

A proper slack in the coupling has been reestablished.

Figure 7:
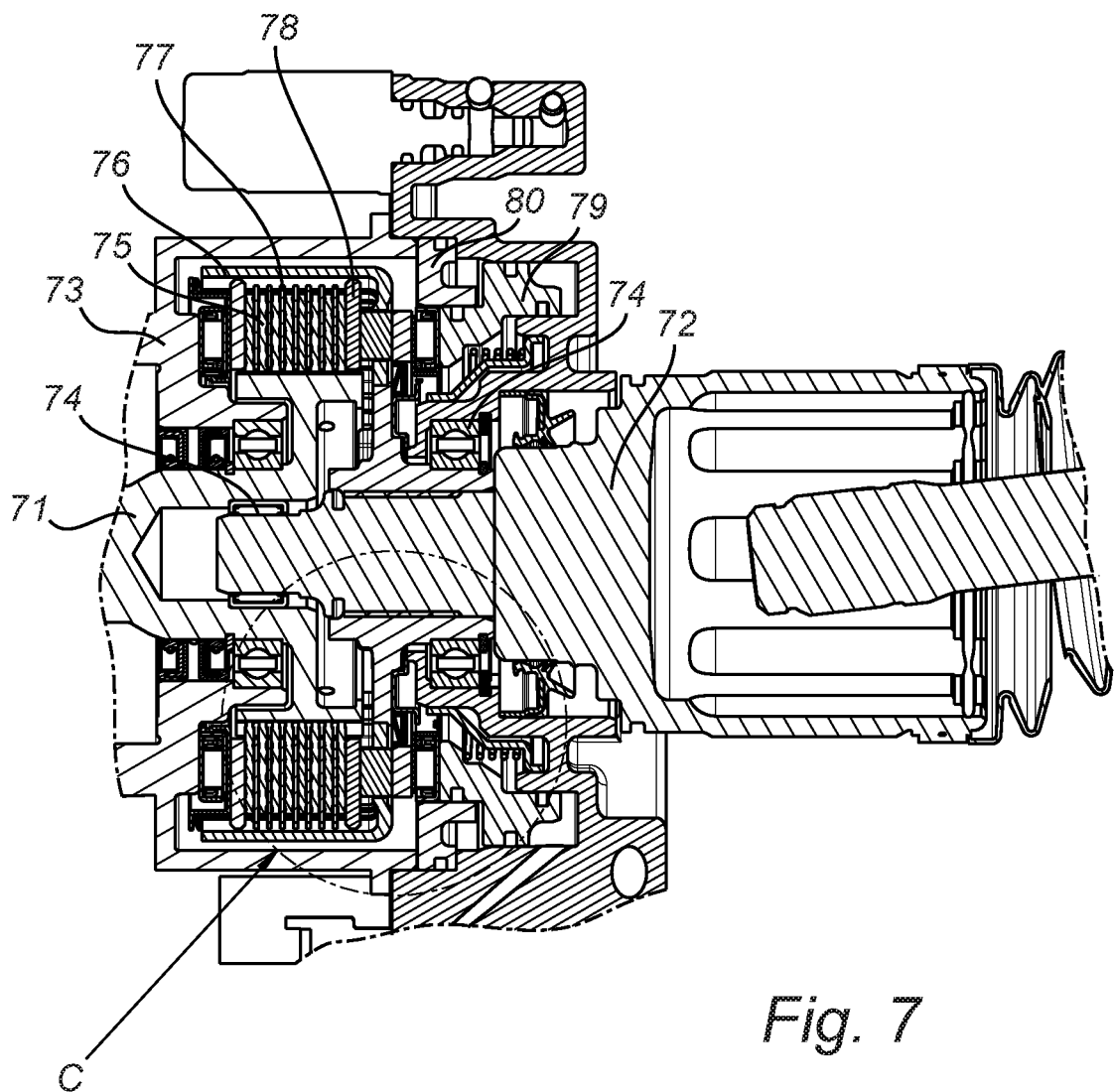
FIG. 7 is a cross section through a wet disc coupling with a slack adjuster according to a third embodiment of the invention, the coupling being shown in a connect mode.

A third embodiment of a wet disc coupling is shown in section in FIG. 7.

The purpose of the coupling is to selectively connect an ingoing axle 71 to an outgoing axle 72, coaxial therewith. The two axles 71 and 72 are journalled in relation to each other and to a coupling housing 73 by means of bearings 74. A first set of coupling discs 75 is axially movably arranged at the end of the ingoing axle 71. The discs 75 are connected to the end of the ingoing axle 71 for common rotation. Indirectly attached to the outgoing axle 72 is a disc sleeve 76, in which a second set of coupling discs 77 is axially movably arranged. The discs 77 are connected to the disc sleeve 76 for rotation therewith. Discs from the two sets 75, 77 alternate. If the discs 75, 77 are pressed together by means of a rotatable disc ring 78, the two axles 71, 72 will be connected to each other (connect mode). If not, the two axles 71, 72 are not connected to each other (disconnect mode). Lubricating and cooling oil is provided in the compartment containing the discs 75, 77 and neighboring parts. A wet disc coupling is formed. The coupling is shown in its connect mode in FIG. 7.

An annular piston 79 is arranged in the coupling housing 73. It is movable in the axial direction of the two axles 71, 72 to the left in the drawing under the action of hydraulic pressure admitted to the right of it. The piston 79 is guided by a fixed guide sleeve 80 in the coupling housing 73.

The piston 79 is in contact with an axially movable, rotatable press ring 81 via an axial bearing 82. Contact with the rotatable disc ring 78 is provided by means of a rotatable press cylinder 81A.

Figure 8:
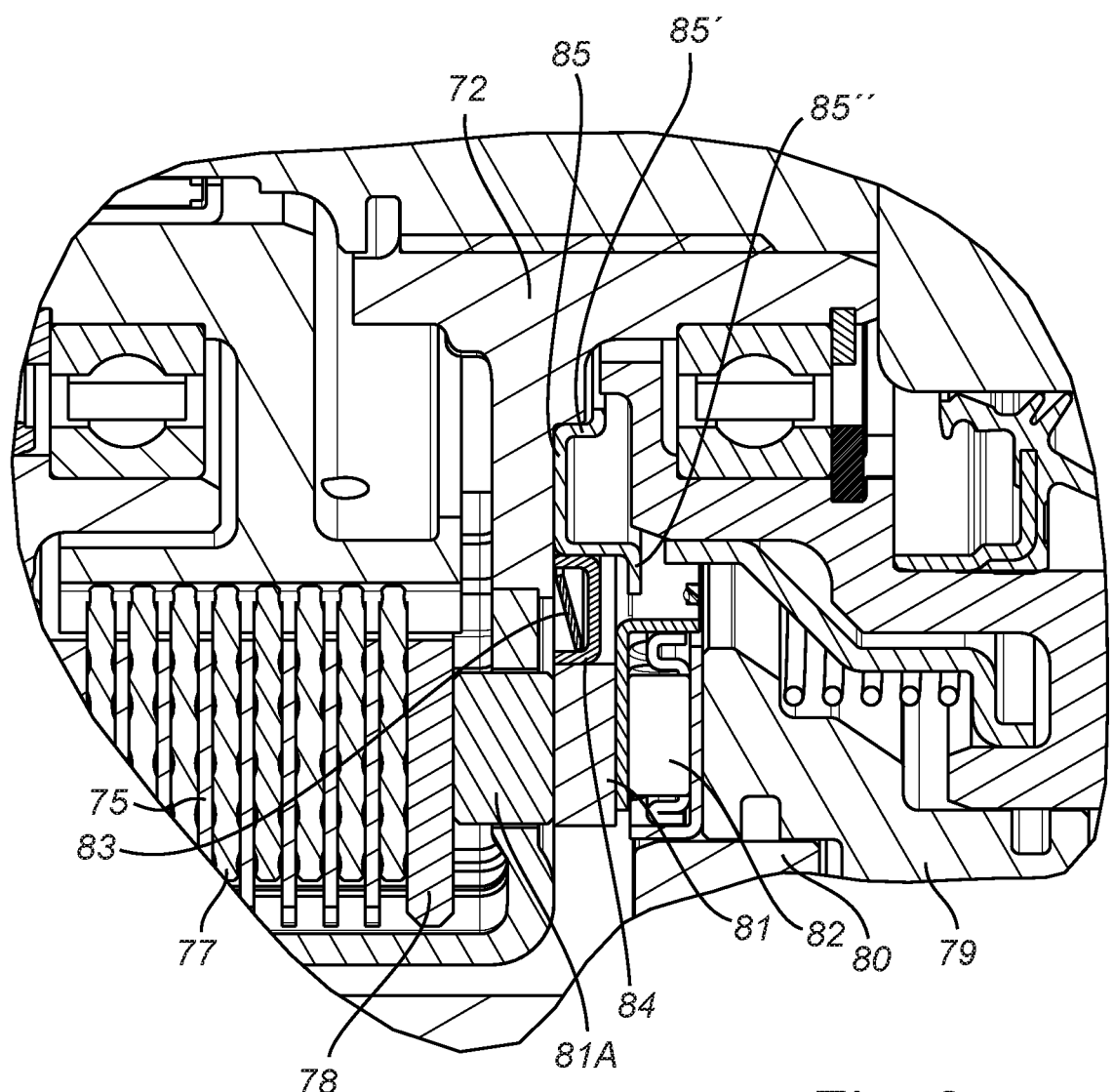
FIG. 8 is an enlarged portion C of FIG. 7.

Accordingly, hydraulic pressure acting on the piston 79 to the left in the drawing will be transmitted as an axial force bringing the discs 75, 77 together and establishing the connect mode shown in FIGS. 7 and 8.

As most clearly shown in FIG. 8, two slack adjuster sleeves are provided: a primary sleeve 84 and a secondary sleeve 85. The two slack sleeves 84 and 85 are generally U-shaped. The primary slack adjuster sleeve 84 is held with a relatively weak press fit on the pressure ring 81 but is freely rotatable in relation to the secondary slack adjuster sleeve 85. This latter sleeve 85 is held with a very hard press fit to the axle 72 at its upper flange 85', so that in practice it is fixed to the axle 72.

A compression spring 83, for example a Belleville spring, can be provided between the primary slack adjuster sleeve 84 and the axle 72 for providing an axial force to the right in the drawing and thus act as a return spring for the piston 79 provided that the press fit between the press ring 81 and the primary sleeve 84 is harder than the force of the spring 83. This spring 83 can also be called a disconnect spring.

If hydraulic pressure is applied to the piston 79 in a disconnect mode, not shown in FIGS. 7 and 8, the piston 79, the press ring 81 and the press cylinder 81A will move to the left in the drawing to the shown connect mode. If the slack in the coupling is within desired limits, i.e. its discs 75, 77 are not unduly worn, the primary slack adjuster sleeve 84 will not during the following return stroke to the disconnect mode under the action of the spring 83 get into operative contact with a control flange 85" of the secondary slack adjuster sleeve 85.

If on the other hand the slack in the coupling has exceeded certain desired limits, i.e. its discs 75, 77 are worn, the primary slack adjuster sleeve 84 will during the return stroke from the shown connect mode to the disconnect mode be stopped by the flange 85" of the secondary slack adjuster sleeve 85. The primary slack adjuster sleeve 84 will be moved on the press ring 81, provided that the force of the return spring or the disconnect spring 83 is greater than the press fit between the press ring 81 and the primary sleeve 84.

A proper slack in the coupling has been reestablished.

In the two first embodiments according to FIGS. 1-3 and FIGS. 4-6 respectively a proper slack is reestablished during the stroke from the disconnect to the connect mode or the application stroke of the hydraulic piston, whereas the opposite is the case in the third embodiment according to FIGS. 7, 8.

Modifications are possible within the scope of the appended claims.

The invention claimed is:

1. A coupling for an all-wheel-drive vehicle, comprising
a disc package with alternating discs, which are connected for rotation with, but are axially movable in relation to an ingoing and an outgoing axle, respectively, of the coupling, and
a hydraulic piston for pressing the disc package together under the action of hydraulic pressure, hereby altering the coupling from a disconnect mode to a connect mode, in which the ingoing axle is connected to the outgoing axle,
a coupling slack adjuster for mechanically establishing a rest position for the hydraulic piston in a disconnect mode, in which a predetermined slack in the disc package is established, irrespective of the wear of the discs,
a primary slack adjuster sleeve, which by press fit connection to a member in the coupling and by working relationship with the piston is able to establish a new rest position for the piston during its return stroke from a connect mode to a disconnect mode, governed by a too long stroke of the piston during its working stroke and under the action of a spring with a lower force than the force of the press fit,
wherein the primary adjuster sleeve is mounted with press fit on a ring surface of a coupling housing, the movement of the sleeve from a disconnect mode to a connect mode of the coupling, when the discs are unduly worn, being induced by a projection on the piston in contact with a sleeve edge.

2. A coupling according to claim 1, wherein a secondary slack adjuster sleeve is attached to a press ring and the piston and connects these two members, the secondary sleeve getting in contact with the primary sleeve during a return stroke of the piston under the action of a return spring or disconnect spring between the piston and a coupling housing part.

3. A coupling for an all-wheel-drive vehicle, comprising
a disc package with alternating discs, which are connected for rotation with, but are axially movable in relation to an ingoing and an outgoing axle, respectively, of the coupling, and
a hydraulic piston for pressing the disc package together under the action of hydraulic pressure, hereby altering the coupling from a disconnect mode to a connect mode, in which the ingoing axle is connected to the outgoing axle,
a coupling slack adjuster for mechanically establishing a rest position for the hydraulic piston in a disconnect mode, in which a predetermined slack in the disc package is established, irrespective of the wear of the discs,
a primary slack adjuster sleeve, which by press fit connection to a member in the coupling and by working relationship with the piston is able to establish a new rest position for the piston during its return stroke from a connect mode to a disconnect mode, governed by a too long stroke of the piston during its working stroke and under the action of a spring with a lower force than the force of the press fit,
wherein the primary slack adjuster sleeve is mounted with press fit on a press ring acted on by the piston over an axial bearing, the movement of the sleeve together with the press ring from a connect mode to a disconnect mode of the coupling being limited by a flange of a secondary slack adjuster sleeve attached to the outgoing axle of the coupling.

4. A coupling according to claim 3, wherein a return spring or disconnect spring is arranged between the outgoing axle of the coupling and the primary slack adjuster sleeve.

* * * * *